United States Patent Office 3,356,661
Patented Dec. 5, 1967

3,356,661
PROCESS OF POLYMERIZING ISOBUTENE IN PRESENCE OF TITANIUM TETRAHALIDE AND A TRIHALOACETIC ACID
Lester E. Coleman, Cleveland, Ohio, assignor to The Lubrizol Corporation, Wickliffe, Ohio, a corporation of Ohio
No Drawing. Continuation of application Ser. No. 255,205, Jan. 31, 1963. This application Nov. 28, 1966, Ser. No. 597,478
11 Claims. (Cl. 260—85.3)

This application is a continuation of application Serial No. 225,205, filed Jan. 31, 1963, and now abandoned.

This invention relates to an improved method for the production of polymerization products of isobutene and mixtures of isobutene and other olefins and di-olefins.

It is well known that low molecular weight olefins such as ethylene, propylene, and isobutene are polymerized by catalysts of the Friedel-Crafts type, such as aluminum halides, ferric halides, zinc halides, boron halides, tin halides, mercuric halides, and titanium halides. The molecular weight of the polymer which results is greater the lower the polymerization temperature and the purer the reactants. For example, liquid isobutene may be polymerized at $-112°$ F. using boron trifluoride as the catalyst to give a polymer having an average molecular weight of about 70,000. At $-153°$ F. the products obtained have molecular weights in the range of 150,000 to 200,000 or more. If, however, the isobutene is contaminated with other unsaturated hydrocarbons, such as the n-butenes, the molecular weight of the polymer prepared at $-153°$ F. is only 10,000 to 15,000.

Another catalyst which may be used to effect the polymerization of olefins, such as isobutene, is a mixture of a titanium halide and a co-catalyst such as acetic acid, trichloroacetic acid, or sulfuric acid. The procedure consists of adding the co-catalyst, e.g., trichloroacetic acid, to a mixture of monomer, solvent and titanium halide. The reverse method, in which the titanium halide is added to a mixture of monomer, solvent, and co-catalyst has also been used. In both methods, the titanium halide and the co-catalyst come into contact with each other to form the catalyst in the presence of the olefin. Polymers prepared by either method within the temperature range of $-5°$ to $-60°$ F. have relatively low molecular weights which seldom exceed 20,000 or 30,000.

Other catalysts which may be used to effect the polymerization of low molecular weight olefins are the double salts formed by the reaction of a Friedel-Crafts halide such as titanium tetrachloride with acetic acid accompanied by the evolution of hydrogen chloride. Polymers prepared by utilizing these double salts at temperatures in the vicinity of $-60°$ F. are found to have average molecular weights up to about 5,000.

In order to prepare high molecular weight polymers, for example, 150,000 and higher, by any of the procedures known in the art it is necessary to effect the polymerization at temperatures below $-100°$ F. In addition to the added cooling expense, these methods suffer the disadvantage also of difficult temperature control. Since the molecular weight of the polymer is dependent upon the temperature of the polymerization, a fluctuating reaction temperature results in a mixture of polymers having a wide range of molecular weights.

Accordingly, it is an object of this invention to provide an efficient process for the production of high molecular weight polymers.

It is also an object of this invention to provide a process for the polymerization of olefins at a constant temperature.

It is a further object of this invention to provide a process whereby high molecular weight polymers are obtained without resort to relatively low polymerization temperatures.

It is a further object of this invention to provide a process for the preparation of high molecular weight interpolymers from mixtures of olefins.

These and other objects are obtained in accordance with this invention by providing a process of polymerizing an olefin comprising the steps of preparing a catalyst by mixing a titanium halide with from about 0.1 to about 10 molar proportions of a trihaloacetic acid and contacting said catalyst with an olefin selected from the class consisting of isobutene and mixtures of isobutene and conjugated dienes to effect polymerization.

The polymerization may be carried out over a wide range of temperatures. Ordinarily, a temperature below $80°$ F. is chosen. When polymers having molecular weights in the range of 50,000 to 300,000 are desired, a temperature below about $-10°$ is preferred. The lower the reaction temperature, the higher the molecular weight of the polymer. Inasmuch as the reaction is exothermic, external cooling may be required to maintain the reaction temperature within the desired range.

Only a very small amount of the catalyst is needed to bring about the desired polymerization. The amount of titanium halide present in the catalytic mixture may be as low as 0.01% by weight based on the amount of monomer present. The preferred amount is in the neighborhood of 0.5–1.5% although greater amounts may be used but appear to offer little additional benefit.

The olefins useful as monomers in the process of this invention include isobutene which may be of a commercial grade such as is obtained from petroleum refinery streams containing minor amounts of $C_3$ and $C_5$ hydrocarbons. Mixtures of isobutene and conjugated dienes also are useful monomers. Examples of the conjugated dienes which may be used are butadiene, hexadiene, pentadiene, cyclohexadiene, cyclopentadiene, piperylene, isoprene, chloroprene, styrene, and $\alpha$-methyl styrene. The relative proportion of isobutene to conjugated diene may vary from about 1:1 to about 99:1. For reasons of oil-solubility and stability, a weight ratio in the range of 4:1 to 50:1 is generally preferred. Specific examples of such mixtures include the mixture of 98% (by weight) of isobutene and 2% of piperylene; mixture of 98% of isobutene and 2% of hexadiene; mixture of 98% of isobutene and 2% of cyclohexadiene; mixture of 95% of isobutene ano 5% of piperylene; mixture of 95% of isobutene and 5% of isoprene; mixture of 85% of isobutene and 15% of piperylene; mixture of 80% of isobutene and 20% of piperylene; mixture of 75% of isobutene and 25% of chloroprene; mixture of 50% of isobutene and 50% of piperylene; mixture of 50% of isobutene and 50% of isoprene; mixture of 98% of isobutene, 1% of isoprene and 1% of piperylene; mixture of 95% of isobutene, 3% of piperylene and 2% of chloroprene; and the mixture of 95% of isobutene, 3% of piperylene, and 2% of isoprene. The relative proportion of isobutene to diolefin is selected according to the desired properties of the finished product.

The polymerization of isobutene containing various amounts of 1-butene and 2-butene likewise can be carried out by the process of this invention. Examples of such mixtures include the mixture of 80% of isobutene and 20% of cis-2-butene; 80% of isobutene and 20% of trans-2-butene; 60% of isobutene and 40% of 1-butene; 60% of isobutene and 40% of cis-2-butene; 60% of isobutene and 40% of a commercial mixture of isomeric butenes.

The titanium halides useful in the preparation of the catalyst include titanium tetrafluoride titanium tetrachloride, and titanium tetrabromide. The trihaloacetic acids which are useful to prepare the catalyst complex include trifluoroacetic acid, trichloroacetic acid, and tribromoacetic acid. Any combination may be used but for reasons of convenience, economy and reactivity, the titanium tetrachloride-trichloroacetic acid mixture is preferred.

As stated previously, the particular feature of the process of this invention involves the step of separately preparing the catalyst complex and subsequently contacting the olefin with this preformed catalyst. The catalyst is prepared by merely mixing the titanium halide and the trihaloacetic acid. Although the catalyst mixture prepared from titanium halide and trihaloacetic acid in a molar ratio ranging from about 10:1 to about 1:10 may be used satisfactorily, the preferred range is from about 4:1 to 1:4 and especially from about 1:1 to about 2:1.

A preferred method of preparing the catalyst is to mix the titanium halide and the trihaloacetic acid in an inert solvent such as carbon tetrachloride, chloroform, trichloroethylene, chlorobenzene, pentane, hexane, heptane, cyclohexane, benzene, or toluene. The formation of the catalyst is conveniently carried out at room temperature and no hydrogen halide is evolved even if the solution is warmed to 150° F.

Halogen free acetic acids are not useful as co-catalysts in the process of this invention. The reaction of a titanium halide with acetic acid itself results in the loss of hydrogen halide and formation of a double salt as described previously.

The solvent may be removed after the catalyst of the present invention is formed so that the catalyst can be contacted with the olefin in the absence of any solvent if so desired. Ordinarily, however, the catalyst is prepared as a 5% to 15% solution in any of the given solvents and is added slowly to the olefin monomer. This procedure is generally preferred since it results in improved temperature control and polymers having more uniform molecular weights.

To carry out the polymerization step, the olefinic reactant is usually dissolved in a solvent such as carbon tetrachloride, chloroform, pentane, hexane, or heptane and the solution is brought into contact with the catalyst. In most cases it is less preferable to carry out the polymerization in the absence of a solvent because of process difficulties associated with temperature control and the handling of viscous polymerized products. The monomer-solvent weight ratio may vary from 1:1 to 1:10 and the generally preferred ratio is 1:2.

After the polymerization is completed the titanium halide-trihaloacetic acid complex is removed by any of several methods. Addition of an alcohol such as methanol, ethanol, or isopropanol to the reaction mixture precipitates the polymer product from the reaction mixture. Contacting the reaction mixture with ammonia is also an effective method to remove the catalyst in the form of a solid complex which can be separated by filtration. Still another method which is commercially attractive is to filter the reaction mixture through Fuller's earth or some other alkaline solid substance capable of retaining the catalyst by forming an insoluble complex.

The character of the product depends to a considerable extent on the particular olefin or olefin mixture polymerized, on the purity of the original reactants, and on the temperature of the reaction mixture. As mentioned previously an important embodiment of the process of this invention involves the separate step of preparing the catalyst. Thus the catalyst may be added to the reaction mixture at a rate which will not cause the reaction mixture to undergo sudden or substantial temperature variations. Since the molecular weight of a particular polymer is dependent upon the temperature of the polymerization reaction, a narrow temperature range is desired if the average molecular weight of the polymer is to represent a mixture of polymers having a narrow range of molecular weights.

Another significant advantage of the process of this invention is the fact that olefins such as isobutene may be polymerized in the presence of substances such as butenes which normally act as poisons. There are many reports in the art which discuss the poisoning effect of the n-butenes when attempts are made to polymerize olefins containing varying amounts of the n-butenes. Specifically, 1-butene and 2-butene are reported to substantially reduce the molecular weight of a polymer prepared from isobutene contaminated with one of these materials.

However, mixtures of isobutene and trans-2-butene have been readily polymerized by the process of this invention since trans-2-butene behaves as a diluent rather than as a poison in this process. Thus, for example, the use of 40% isobutene and 60% trans-2-butene gives essentially the same molecular weight and isobutene conversion as obtained with pure isobutene. It is therefore unnecessary in most instances to undergo the expense of removing the trans-2-butene which may be present in a commercial isobutene fraction.

The following examples are illustrative of the process of this invention:

*Example 1*

A mixture of 100 grams (1.8 moles) of isobutene and 200 grams of n-heptane is cooled to −10° F. The catalyst which is prepared as a 10% solution in carbon tetrachloride by dissolving 1 gram of titanium tetrachloride and 0.114 gram of trichloroacetic acid in 13.9 grams of carbon tetrachloride is added dropwise to the cooled isobutene solution over a period of 1¼ hours. The reaction temperature is maintained within the range of −10° F. to 6° F. throughout the addition by external cooling. The catalyst is then destroyed by adding 400 ml. of methanol with stirring for ½ hour. The upper methanol layer is decanted and the residue is dissolved in 250 ml. of refluxing benzene. The clear solution is poured into 400 ml. of methanol to precipitate the polymer. Methanol and benzene are removed by decantation and the polymer is dried by heating at 250° F. for 18 hours. Polyisobutene prepared in this manner is a clear, colorless solid having a molecular weight of $177 \times 10^3$.

*Example 2*

A mixture of 100 grams (1.8 moles) of isobutene and 200 grams of n-heptane is cooled to −25° F. The catalyst which is prepared as a 10% solution in carbon tetrachloride by dissolving 1 gram (0.0052 mole) of titanium tetrachloride and 0.43 gram (0.0026 mole) of trichloroacetic acid in 12.87 grams of carbon tetrachloride is added dropwise to the cooled isobutene solution over a period of 45 minutes. The reaction temperature is maintained constant at −25° F. throughout the reaction. After stirring the mixture an additional 15 minutes, the catalyst is destroyed by adding 457 grams of methanol. The product which is recovered as the precipitate is dissolved in benzene, reprecipitated in methanol and dried by heating. Polyisobutene prepared in this manner has a molecular weight of $260 \times 10^3$.

*Example 3*

To 300 grams (5.4 moles) of isobutene there is added a solution containing 0.195 gram (0.001 mole) of titanium tetrachloride and 0.054 gram (0.00033 mole) of trichloroacetic acid in 1.7 grams of n-heptane over a period of 2 minutes while maintaining the reaction temperature at −29° F. The reaction mixture is maintained at this temperature and stirred for a total of one hour. The catalyst is then destroyed by the addition of methanol which also precipitates the polymer. The precipitate is dissolved in benzene and the clear solution is poured into 500 ml. of methanol. The precipitate is then dried by heating. Polyisobutene prepared in this manner has a molecular weight of $181 \times 10^3$.

Example 4

The catalyst is prepared by dissolving 0.19 gram (0.001 mole) of titanium-tetrachloride and 0.08 gram (0.0005 mole) of trichloroacetic acid in 4.73 grams of n-heptane at 75° F. The catalyst is then added drop wise to 300 grams (5.4 moles) of isobutene over a period of 5 minutes. The reaction temperature is maintained at 25° throughout the addition and for a total reaction time of 1 hour. The catalyst is then de-activated by the addition of 10 ml. of methanol and the mixture is poured into 1500 ml. of methanol to precipitate the polymer. The polymer is dissolved in hot benzene, reprecipitated with methanol, and dried by heating. The polyisobutene prepared in this manner has a molecular weight of $316 \times 10^3$.

Example 5

A mixture of 100 grams (1.8 moles) of isobutene and 200 grams of n-heptane is cooled to $-25°$ F. To this mixture there is added 7.5 grams of a solution containing the catalyst prepared by dissolving 1 gram (0.006 mole) of titanium tetrachloride and 0.43 gram (0.0026 mole) of trichloroacetic acid in 13.57 grams of carbon tetrachloride. The mixture is stirred for 2 hours while maintaining the reaction temperature below 0° F., preferably between $-20$ and $-25°$ F. The reaction is concluded by adding 400 mls. of methanol with stirring. The methanol is decanted and the precipitate dissolved in warm benzene by refluxing. The benzene solution is poured into methanol to reprecipitate the polymer. After removing the methanol benzene mixture, the polymer is dried by heating. The polyisobutene prepared in this manner has a molecular weight of $216 \times 10^3$.

Example 6

The procedure of Example 5 is repeated with the exception that the mixture is stirred for 6 hours rather than 2 hours. The polyisobutene prepared in this manner has a molecular weight of $128 \times 10^3$.

Example 7

A mixture of 100 grams of isobutene and 200 grams of n-heptane is cooled to $-10°$ F. The catalyst which is prepared by dissolving 1.0 gram of titanium tetrachloride and 0.859 gram of trichloroacetic acid in 13.2 grams of carbon tetrachloride is added dropwise to the cooled isobutene solution over a period of 1 hour. The reaction temperature is maintained between 0° and $-10°$ F. throughout the addition and for an additional 15 minutes whereupon the catalyst is removed by adding 400 ml. of methanol with stirring. The product which is recovered as the precipitate is dissolved in benzene, re-precipitated in methanol, and dried by heating. Polyisobutene prepared in this manner has a molecular weight of $135 \times 10^3$.

Example 8

A mixture of 100 grams (1.8 moles) of isobutene and 200 grams of n-heptane is cooled to $-25°$ F. To this mixture there is added 15 grams of the catalyst prepared by dissolving 1 gram of titanium tetrachloride and 0.86 gram of trichloroacetic acid in 13.2 grams of carbon tetrachloride over a period of 30 minutes while maintaining the reaction temperature between $-25°$ and $-24°$ F. The reaction mixture is stirred an additional 3.5 hours at this temperature and 250 ml. of methanol is added to remove the catalyst and precipitate the polymer. The polymer is dissolved in benzene, re-precipitated in methanol and dried by heating. Polyisobutene prepared in this manner has a molecular weight of $156 \times 10^3$.

Example 9

The procedure of Example 2 is repeated using a catalyst which is prepared by dissolving 3.44 grams (0.0208 mole) of trichloroacetic acid and 1 gram (0.0052 mole) of titanium tetrachloride in 40 grams of carbon tetrachloride.

Example 10

The procedure of Example 2 is repeated using a catalyst which is prepared by dissolving 3.44 grams (0.0208 mole) of trichloroacetic acid and 0.5 gram (0.0026 mole) of titanium tetrachloride in 30 grams of carbon tetrachloride.

Example 11

A mixture of 850 grams of isobutene and 150 grams of piperylene is cooled to $-107°$ F. by the addition of Dry Ice. To this mixture there is added over a period of ½ hour, 150 grams of the solution prepared by dissolving 10 grams of titanium tetrachloride and 4.3 grams of trichloroacetic acid in 135.7 grams of carbon tetrachloride. The reaction temperature is maintained at $-107°$ F. throughout the addition. The reaction mixture becomes very viscous and 500 ml. of methanol is added to remove the complex and stop the reaction. The methanol and other unreacted chemicals are decanted and 800 ml. of toluene is added carefully and slowly to dissolve the copolymer. This solution is poured into 2 gallons of methanol to precipitate the copolymer which is redissolved in 1 liter of benzene and reprecipitated with methanol. The copolymer is dried by heating and has a molecular weight of $42 \times 10^3$.

Example 12

A mixture of 900 grams of isobutene, 100 grams of isoprene and 500 grams of n-heptane is cooled to $-107°$ F. by the addition of Dry Ice. To this mixture there is added dropwise over a period of 1 hour, 150 grams of the catalyst solution prepared as in Example 9. The reaction temperature is maintained at $-107°$ F. throughout the addition and for an additional ½ hour. The reaction is concluded by adding 800 ml. of methanol which decomposes the complex and precipitates the polymer. The precipitate is dissolved in 800 ml. of benzene and reprecipitated by pouring into 3 gallons of methanol. The precipitated polymer is dissolved in 600 ml. of benzene and 400 grams of mineral oil is added. The benzene is removed by distillation leaving a 50% mineral oil solution of the copolymer of isobutene and isoprene having a molecular weight of $50 \times 10^3$.

Example 13

A mixture of 150 grams of isobutene and 150 grams of isoprene is cooled to $-107°$ F., and 45 grams of a solution prepared by dissolving 3 grams of titanium tetrachloride and 1.3 grams of trichloroacetic acid in 40.7 grams of carbon tetrachloride is added dropwise over a period of 45 minutes. The reaction is exothermic and the reaction temperature reaches $-50°$ F. during the adidtion. Methanol is added to the reaction mixture to precipitate a light yellow rubber.

Example 14

A mixture of 80 grams of isobutene, 20 grams of cis-butene-2, and 200 grams of n-heptane is cooled to $-25°$ F. To this mixture there is added over a 1¼ hour period, 15 grams of a solution prepared by dissolving 1 gram of titanium tetrachloride and 0.43 gram of trichloroacetic acid in 13.57 grams of carbon tetrachloride. The reaction temperature is maintained at $-25°$ F. during the addition and for an additional period of 4½ hours at which time 400 ml. of methanol is added to stop the reaction and decompose the catalyst. The methanol is decanted from the polymer and the polymer is dissolved in warm benzene. The clear solution is poured into methanol with stirring and after ½ hour, the methanol-benzene mixture is removed from the flask leaving the product which is dried by heating. The polymer prepared in this manner has a molecular weight of $86 \times 10^3$.

Example 15

A mixture of 60 grams of isobutene, 40 grams of cis-butene-2, and 200 grams of n-heptane is cooled to $-25°$ F. To this mixture there is added 15 grams of a solution containing the catalyst prepared as in Example 12 over a period of 1¼ hours. The temperature is maintained between —21° and —25° F. throughout the addition and for an additional 4½ hours at which time the reaction is stopped by adding 400 ml. of methanol. The methanol is decanted leaving the polymer residue which is dissolved in warm benzene. The clear solution is poured into methanol to reprecipitate the polymer. The methanol is removed and the polymer residue dried by heating. The polymer prepared in this manner has a molecular weight of $43 \times 10^3$.

*Example 16*

A mixture of 80 grams of isobutene, 20 grams of trans-butene-2 and 200 grams of n-heptane is cooled to —25° F. and 15 grams of the catalyst solution prepared as in Example 12 is added over a period of 70 minutes while maintaining the reaction temperature at —25° F. The reaction mixture was stirred an additional 5½ hours at this temperature and 400 ml. of methanol is then added. The methanol-heptane mixture is removed and the polymer dissolved in 250 grams of benzene. The clear solution is poured into methanol with stirring for ½ hour and the methanol-benzene mixture is decanted leaving a polymer which is dried by heating and has a molecular weight of $129 \times 10^3$.

*Example 17*

A mixture of 40 grams of isobutene, 60 grams of trans-butene-2 and 200 grams of n-heptane is cooled to —25° F. and 15 grams of the catalyst solution prepared as in Example 12 is added over a period of 1¼ hours. The reaction temperature is maintained between —23° and —25° F. throughout the addition period and for an additional 4¾ hours. The reaction is stopped by adding 400 ml. of methanol with stirring. The methanol is decanted from the precipitate and the precipitate dissolved in 250 grams of warm benzene. The clear solution is poured into methanol with stirring to precipitate the product. The benzene-methanol mixture is removed and the precipitate dried by heating. The polymer prepared in this manner has a molecular weight of $136 \times 10^3$.

*Example 18*

A mixture of 80 grams of isobutene, 20 grams of butene-1, and 200 grams of n-heptane is cooled to —25° F. and 15 grams of the catalyst solution prepared as in Example 12 is added over a period of 70 minutes. The reaction temperature is maintained between —22° and —25° F. throughout the addition and for an additional 5½ hours. The catalyst is then precipitated by adding 400 ml. of methanol. The methanol-heptane mixture is decanted and the residue dissolved in 250 grams of warm benzene. The clear solution is then poured into methanol with stirring to reprecipitate the polymer. After removing the methanol benzene mixture the precipitate is dried by heating. The polymer prepared in this manner has a molecular weight of $59 \times 10^3$.

*Example 19*

A mixture of 60 grams of isobutene, 40 grams of butene-1, and 200 grams of n-heptane is cooled to —25° F. and 15 grams of the catalyst solution prepared as in Example 12 is added over a period of 70 minutes. The reaction temperature is maintained between —23 and —25° F. throughout the addition and for an additional 4½ hours at which time the reaction is stopped by adding 400 ml. of methanol. The methanol-heptane mixture is removed and the residue dissolved in 250 grams of benzene by heating to reflux for ½ hour. The clear solution is poured into methanol to reprecipitate the polymer. After removing the methanol-benzene mixture the residue is dried by heating. The polymer prepared in this manner has a molecular weight of $32 \times 10^3$.

*Example 20*

The procedure of Example 2 is repeated using a catalyst which is prepared as a 10% solution in n-heptane by dissolving 2 grams of titanium tetrabromide and 0.83 gram of tribromoacetic acid in 25.65 grams of n-heptane. No hydrogen bromide is evolved when the catalyst is prepared.

*Example 21*

The procedure of Example 4 is repeated using the catalyst which is prepared as a 5% solution in n-heptane by dissolving 0.75 gram of titanium tetrafluoride and 0.32 gram of trifluoroacetic acid in 19 grams of n-heptane. No hydrogen fluoride is formed when the catalyst is prepared.

*Example 22*

The procedure of Example 4 is repeated using the catalyst prepared as a 5% solution in n-heptane by dissolving 1 gram of titanium tetrachloride and 0.77 gram of tribromoacetic acid in 33.6 grams of n-heptane. No hydrogen halide is formed when the catalyst is prepared.

*Example 23*

To 300 grams of isobutene cooled to —30° F. there is added over a 3-minute period, 5.7 grams of a catalyst solution prepared by dissolving 1 gram of titanium tetrachloride and 0.43 gram of trichloroacetic acid in 8.57 grams of n-heptane. The reaction temperature is maintained between —21° and —31° F. throughout the addition and for a total reaction time of 1 hour. Ammonia gas (0.051 gram) is bubbled under the surface of the polymer solution to deactivate the catalyst and the solution is stirred for an additional 15 minutes. At this point the solution is divided into two portions, A and B. Portion A is poured into methanol to precipitate the polymer which is then dissolved in benzene and reprecipitated with methanol. The polymer isolated in this manner has a molecular weight of $180 \times 10^3$.

Portion B is added to mineral oil and the volatile materials removed by heating. The residue is a mineral oil solution of polyisobutene having a molecular weight of $175 \times 10^3$.

*Example 24*

A solution of 10 grams of trichloroacetic acid in 66.54 grams of petroleum ether (boiling point range 39°–51° C.) is cooled to 43° F. and 11.57 grams of titanium tetrachloride is added dropwise. No hydrogen chloride is formed. The mixture is stirred at this temperature for 1½ hours. The petroleum ether is evaporated leaving the titanium tetrachloride-trichloroacetic acid catalyst as the residue having a chlorine content of 65.8% (theory 62.4%) and a titanium content of 13.5% (theory 15.25%).

*Example 25*

The procedure of Example 5 is repeated using as catalyst 1.3 grams of the solid catalyst prepared as in Example 22.

*Example 26*

To 80 grams of isobutene there is added a solution containing 0.8 gram of titanium tetrachloride and 0.35 gram of trichloroacetic acid in 13.85 grams of n-heptane over a period of 1 hour while maintaining the reaction temperature at 72° F. to 77° F. The reaction mixture is maintained within this temperature range and stirred for a total of 3½ hours. The catalyst is removed by the addition of methanol which also precipitates the polymer. The precipitate is dissolved in benzene and the clear solution is poured into methanol. The precipitate is dried by heating. Polyisobutene prepared in this manner has a molecular weight of 2000.

This invention is not intended to encompass the polymerization processes whereby a titanium halide is added to a trihaloacetic acid-olefin mixture or whereby a trihaloacetic acid is added to a titanium halide-olefin mixture.

That the process of the present invention is superior to either of these processes is illustrated by the following examples.

*Example 27*

A mixture of 186 grams of n-heptane, 100 grams (1.8 moles) of isobutene and 1 gram (0.0052 mole) of titanium tetrachloride is cooled to −25° F. A solution of 0.43 gram (0.0026 mole) of trichloroacetic acid in 14.57 grams of carbon tetrachloride is added dropwise to the cooled isobutene solution over a period of 15 minutes during which time the reaction temperature reached −2° F. The reaction mixture is cooled to −25° F. and stirred for a total of 6.5 hours. Methanol is then added to destroy the catalyst. The methanol layer is removed and the residue washed once with methanol and dissolved in benzene. The benzene solution is dissolved in 300 grams of mineral oil and the benzene is removed by heating to 120° C./9 mm. Polyisobutene prepared in this manner has a molecular weight of $96 \times 10^3$.

*Example 28*

A mixture of 200 grams of n-heptane, 100 grams (1.8 moles) of isobutene and 0.43 gram (0.0026 mole) of trichloroacetic acid is cooled to −25° F. To this mixture there is added 15 grams of a solution prepared by dissolving 1 gram (0.0052 mole) of titanium tetrachloride in 14 grams of carbon tetrachloride over a period of 55 minutes. The reaction temperature reaches a maximum of −9° F. during and shortly after the addition and is cooled to −23° F. and held at this temperature for a total reaction time of 6.5 hours. The reaction mixture is then washed with methanol and dissolved in benzene. The benzene solution is washed with methanol, dried, and dissolved in 300 grams of mineral oil. The benzene is removed by heating, leaving a mineral oil solution containing 24% polyisobutene having a molecular weight of $90 \times 10^3$.

The inadequacies of the processes of Examples 27 and 28 should be obvious in light of the present invention. In both examples, the reaction temperature is difficult to control and the molecular weight of the product is low with respect to the process of the present invention. Specifically, the temperature rise in Example 27 is 22° F. and the product has a molecular weight of only 96,000 and in Example 28, the temperature rise is 16° F. and the molecular weight of the polymer is only 90,000.

The interpolymerization products obtained by the process of this invention may be treated with sulfur containing materials such as $P_2S_5$ to produce highly cross-linked rubber-like materials which are useful as electrical wire coatings. For example, heating a mixture of 750 grams of the interpolymer of 80% (by weight) of isobutene and 20% of piperylene and 594 grams of mineral oil to a temperature of 210° C. and adding 91 grams of $P_2S_5$ in small increments over a one-hour period resulted in the formation of a light colored rubber.

The polymers recovered from the process of this invention range in molecular weight from about 5000 to about 400,000. The products of this invention are readily soluble in petroleum oils, small amounts greatly increasing the viscosity thereof. The preferred starting material, isobutene, produces polymers which not only increase viscosity but likewise favorably affect the viscosity-temperature curve of the oil to which it is added.

What is claimed is:

1. In the process of polymerizing an olefin, the steps of preparing a homogeneous catalyst mixture by mixing a titanium halide selected from the class consisting of titanium tetrafluoride, titanium tetrachloride, and titanium tetrabromide with from about 0.1 to about 10 molar proportions of a trihaloacetic acid selected from the class consisting of trichloroacetic acid, tribromoacetic acid, and trifluoroacetic acid and thereafter contacting said homogeneous catalyst mixture with an olefin selected from the class consisting of isobutene, mixtures of isobutene and conjugated dienes, and mixtures of isobutene with 1-butene, cis-2-butene, or trans-2-butene to effect polymerization; with the proviso that said mixtures can contain minor amounts of $C_3$ and $C_5$ hydrocarbons.

2. In the process of polymerizing an olefin, the steps of preparing a homogeneous catalyst mixture in a liquid solvent selected from the class consisting of hydrocarbons and halohydrocarbons by dissolving a titanium halide selected from the class consisting of titanium tetrafluoride, titanium tetrachloride and titanium tetrabromide and from about 0.10 to about 10 molar proportion of a trihaloacetic acid in said solvent and thereafter contacting said homogeneous catalyst mixture with an olefin selected from the class consisting of isobutene, mixture of isobutene and conjugated dienes, and mixtures of isobutene with 1-butene, cis-2-butene, or trans-2-butene to effect polymerization; with the proviso that said mixtures can contain minor amounts of $C_3$ and $C_5$ hydrocarbons.

3. The process of claim 1 characterized further in that the titanium halide is titanium tetrachloride.

4. The process of claim 1 characterized further in that the trihaloacetic acid is trichloroacetic acid.

5. In the process of polymerizing an olefin selected from the class consisting of isobutene, mixtures of isobutene and conjugated dienes, and mixtures of isobutene with 1-butene, cis-2-butene, or trans-2-butene; with the proviso that said mixtures can contain minor amounts of $C_3$ and $C_5$ hydrocarbons, the steps of preparing a homogeneous catalyst mixture by dissolving titanium tetrachloride and from about 0.1 to about 10 molar proportions of trichloroacetic acid in a halohydrocarbon solvent, the amount of titanium tetrachloride being in the range of from about 0.01 to about 2% by weight of said olefin and thereafter contacting said homogeneous catalyst mixture with said olefin to effect polymerization.

6. The process of claim 5 characterized further in that the olefin is commercial grade isobutene.

7. The process of claim 5 characterized further in that the olefin is a mixture of isobutene and piperylene in the weight ratio of from about 99:1 to about 1:1.

8. The process of claim 5 characterized further in that the homogeneous catalyst mixture is prepared by mixing titanium tetrachloride with 0.5 molar proportion of trichloroacetic acid.

9. In the process of polymerizing commercial grade isobutene, the steps of preparing a homogeneous catalyst mixture by dissolving titanium tetrachloride and 0.5 molar proportion of trichloroacetic acid in carbon tetrachloride and adding the homogeneous catalyst mixture to the isobutene to effect polymerization.

10. In the process of polymerizing a mixture of 85 parts by weight of isobutene and 15 parts by weight of piperylene, the steps of preparing a homogeneous catalyst mixture by dissolving titanium tetrachloride and 0.5 molar proportion of trichloroacetic acid in carbon tetrachloride and adding the homogeneous catalyst mixture solution to the olefin mixture to effect polymerization.

11. The process of polymerizing isobutene containing up to 70% of 1-butene, cis-2-butene, or trans-2-butene comprising the steps of preparing a homogeneous catalyst mixture by mixing a titanium halide selected from the class consisting of titanium tetrafluoride, titanium tetrachloride and titanium tetrabromide with from about 0.1 to about 10 molar proportions of a trihaloacetic acid and thereafter contacting said homogeneous catalyst mixture with the isobutene mixture to effect polymerization.

References Cited

UNITED STATES PATENTS 2,891,595   6/1959   Kuntz et al. _____ 260—85.3

(Other references on following page)

OTHER REFERENCES

Ambroz et al.: J. of Poly. Sci., 30, July 1958, pp. 381–389.

Plesch: Chem. Soc. J. (London), 1953, pt. 2, pp. 1653–1658.

Meier: Chem. Soc. J. (London), 1950, pt. IV, pp. 3666–3671.

Vesely: J. Poly. Sci., 30, July 1958, pp. 375–380.

Plesch: Chem. Soc. J. (London), 1950, pt. I, pp. 543–556.

J. L. SCHOFER, *Primary Examiner.*

F. L. DENSON, M. B. KURTZMAN, *Assistant Examiners.*